United States Patent
Anderson et al.

(10) Patent No.: US 7,313,478 B1
(45) Date of Patent: Dec. 25, 2007

(54) METHOD FOR DETERMINING FIELD READINESS USING SOIL MOISTURE MODELING

(75) Inventors: Noel Wayne Anderson, Fargo, ND (US); Mark William Stelford, Sycamore, IL (US); Stephen Michael Faivre, Kingston, IL (US)

(73) Assignee: Deere & Company, Moline, IL (US)

( * ) Notice: Subject to any disclaimer, the term of this patent is extended or adjusted under 35 U.S.C. 154(b) by 9 days.

(21) Appl. No.: 11/449,228

(22) Filed: Jun. 8, 2006

(51) Int. Cl.
G06Q 50/00 (2006.01)
G01W 1/00 (2006.01)

(52) U.S. Cl. .............................. 702/2; 702/5
(58) Field of Classification Search ............... 702/2, 702/5, 3; 701/50, 208, 209, 211, 212
See application file for complete search history.

(56) References Cited

U.S. PATENT DOCUMENTS

| | | | | |
|---|---|---|---|---|
| 5,467,271 A * | 11/1995 | Abel et al. | ...... | 702/5 |
| 5,689,418 A * | 11/1997 | Monson | ...... | 702/2 |
| 5,699,244 A * | 12/1997 | Clark et al. | ...... | 702/2 |
| 5,751,576 A * | 5/1998 | Monson | ...... | 700/83 |
| 5,771,169 A * | 6/1998 | Wendte | ...... | 702/5 |
| 5,878,356 A * | 3/1999 | Garrot et al. | ...... | 701/1 |
| 5,878,371 A * | 3/1999 | Hale et al. | ...... | 702/5 |
| 5,884,224 A * | 3/1999 | McNabb et al. | ...... | 702/2 |
| 5,919,242 A * | 7/1999 | Greatline et al. | ...... | 701/50 |
| 5,938,709 A * | 8/1999 | Hale et al. | ...... | 701/50 |
| 5,975,020 A * | 11/1999 | Caveny et al. | ...... | 119/174 |
| 6,070,673 A * | 6/2000 | Wendte | ...... | 172/2 |
| 6,112,144 A * | 8/2000 | Allen | ...... | 701/50 |
| 6,119,531 A * | 9/2000 | Wendte et al. | ...... | 73/863.52 |
| 6,141,614 A * | 10/2000 | Janzen et al. | ...... | 701/50 |
| 6,505,146 B1 * | 1/2003 | Blackmer | ...... | 702/189 |
| 6,549,852 B2 * | 4/2003 | Hanson | ...... | 702/2 |
| 6,671,698 B2 * | 12/2003 | Pickett et al. | ...... | 707/104.1 |
| 6,735,568 B1 | 5/2004 | Buckwalter et al. | ...... | 705/1 |
| 6,999,877 B1 * | 2/2006 | Dyer et al. | ...... | 702/5 |

OTHER PUBLICATIONS

Bramel, Julien and Simchi-Levi, David "The Capacitated VRP with Equal Demands" in: *The Logic of Logistics: Theory, Algorithms, and Applications for Logistics Management* (Springer-Verlag New York, Inc., 1997) pp. 69-80.

Mitchell, Tom M. "Artificial Neural Networks" in: *Machine Learning* (Boston, WBD/McGraw-Hill, 1997) pp. 81-127 ISBN 0-07-042807-7.

* cited by examiner

Primary Examiner—Donald E McElheny, Jr.

(57) ABSTRACT

A method for determining field readiness using moisture modeling of a plurality of fields in a region of interest includes (a) generating a detailed set of moisture factors covering a plurality of scenarios for each field element of the plurality of field elements for a particular field; (b) repeating act (a) for each field of the region of interest; (c) generating a general set of moisture factors for a particular field of the plurality of fields to be applied to each field element of the plurality of field elements in the particular field; (d) repeating act (c) for each field of the plurality of fields in the region of interest; and (e) estimating soil moisture for each field element in the region of interest based on the detailed set of moisture factors and the general set of moisture factors.

20 Claims, 4 Drawing Sheets

METHOD FOR DETERMINING FIELD READINESS USING SOIL MOISTURE MODELING

FIELD OF THE INVENTION

The present invention relates to field moisture determinations, and more particularly, to a method for determining field readiness using soil moisture modeling of a plurality of fields in a region of interest.

BACKGROUND OF THE INVENTION

A typical method of insuring fields are ready for an operation, such as a fertilizer application, after a rain event involves people driving around in vehicles to physically scout the fields of interest. Such an approach is labor intensive and can be inaccurate because of the quality of observations made from the road. For example, the surface of the field may be dry, but still very wet underneath. Also, parts of the field, particularly low spots, may not be visible from the road. Thus, equipment and material may be dispatched to fields that are not ready for field work. In one such scenario, a fertilizer applicator operator then may be faced with a decision of applying fertilizer with damage to the field or else sending the fertilizer to a storage location for later application and then moving to another field which is hopefully in better condition.

Some soil moisture models provide an opportunity to automatically predict regions that are ready for an operation. One example is the IBIS model currently available from the University of Wisconsin at Madison at the WEB address: http://gaim.unh.edu/Structure/Intercomparison/EMDI/models/ibis.html, http://www.sage.wisc.edu/download/IBIS/ibis.html.

IBIS is a regional scale crop and soil moisture model that can be run at 1 square kilometer (km) resolution. At that resolution, for example, a fertilizer dealer trade area of 25,000 square kilometers would have 25,000 "cells" in its computer simulation and run in a timely fashion. However, many fields are in the 0.25-0.50 square kilometer (km) size, and the 1 square kilometer resolution is not good enough to assess field conditions for some field operations, such as fertilizer application.

Field level soil simulators such as PALMS are currently available from the University of Wisconsin at Madison at the WEB address: (http://www.warf.ws/technologies.jsp?techfield=Environment&msnum=510&casecode=P04428US), and operate with cell sizes of 5 meters by 5 meters (5 m×5 m, or roughly the operating width of many farm machines.

The 5 m linear dimension is 1/200 the 1 km dimension. Thus, a single 1 km by 1 km cell in IBIS would contain 200 by 200 or 40,000 PALMS cells. This is an n^2 computational time growth rate due to increased resolution and ignores any computational time growth from the model algorithms as a function of number of cells. To highlight the significance of this execution time growth rate, suppose the IBIS model would provide an output for the 25,000 square kilometer trade area in 1 hour at 1 square kilometer resolution. It would then take 40,000 hours to get a result at the 5 m*5 m resolution or over 4½ years of continuous execution. This is clearly too long to impact today's field activities in light of a recent rain event, such as last night's rain.

SUMMARY OF THE INVENTION

The present invention provides an estimate of the level of readiness for field operations through modeling at a good spatial resolution that accommodates field sizes of less than 1 square kilometer while providing results soon enough to positively influence field operations relative to other known methods.

The invention, in one form thereof, is directed to a method for determining field readiness using moisture modeling of a plurality of fields in a region of interest. Each field of the plurality of fields is divided into a plurality of field elements. The method includes (a) generating a detailed set of moisture factors covering a plurality of scenarios for each field element of the plurality of field elements for a particular field; (b) repeating act (a) for each field of the region of interest; (c) generating a general set of moisture factors for a particular field of the plurality of fields to be applied to each field element of the plurality of field elements in the particular field; (d) repeating act (c) for each field of the plurality of fields in the region of interest; and (e) estimating soil moisture for each field element in the region of interest based on the detailed set of moisture factors and the general set of moisture factors.

The present invention, in another form thereof, is directed to a method for generating a scouting mission plan. The method includes (a) dividing each field of a plurality of fields into a plurality of field elements; (b) generating a detailed set of moisture factors covering a plurality of scenarios for each field element of the plurality of field elements for a particular field; (c) repeating act (b) for each field of the region of interest; (d) generating a general set of moisture factors for a particular field of the plurality of fields to be applied to each field element of the plurality of field elements in the particular field; (e) repeating act (d) for each field of the plurality of fields in the region of interest; (f) estimating soil moisture for each field element in the region of interest based on the detailed set of moisture factors and the general set of moisture factors; (g) constructing a soil moisture map based on a result of the estimating soil moisture; and (h) processing the soil moisture map and a soil type map to generate the scouting mission plan.

DETAILED DESCRIPTION OF THE INVENTION

Figure 1A:
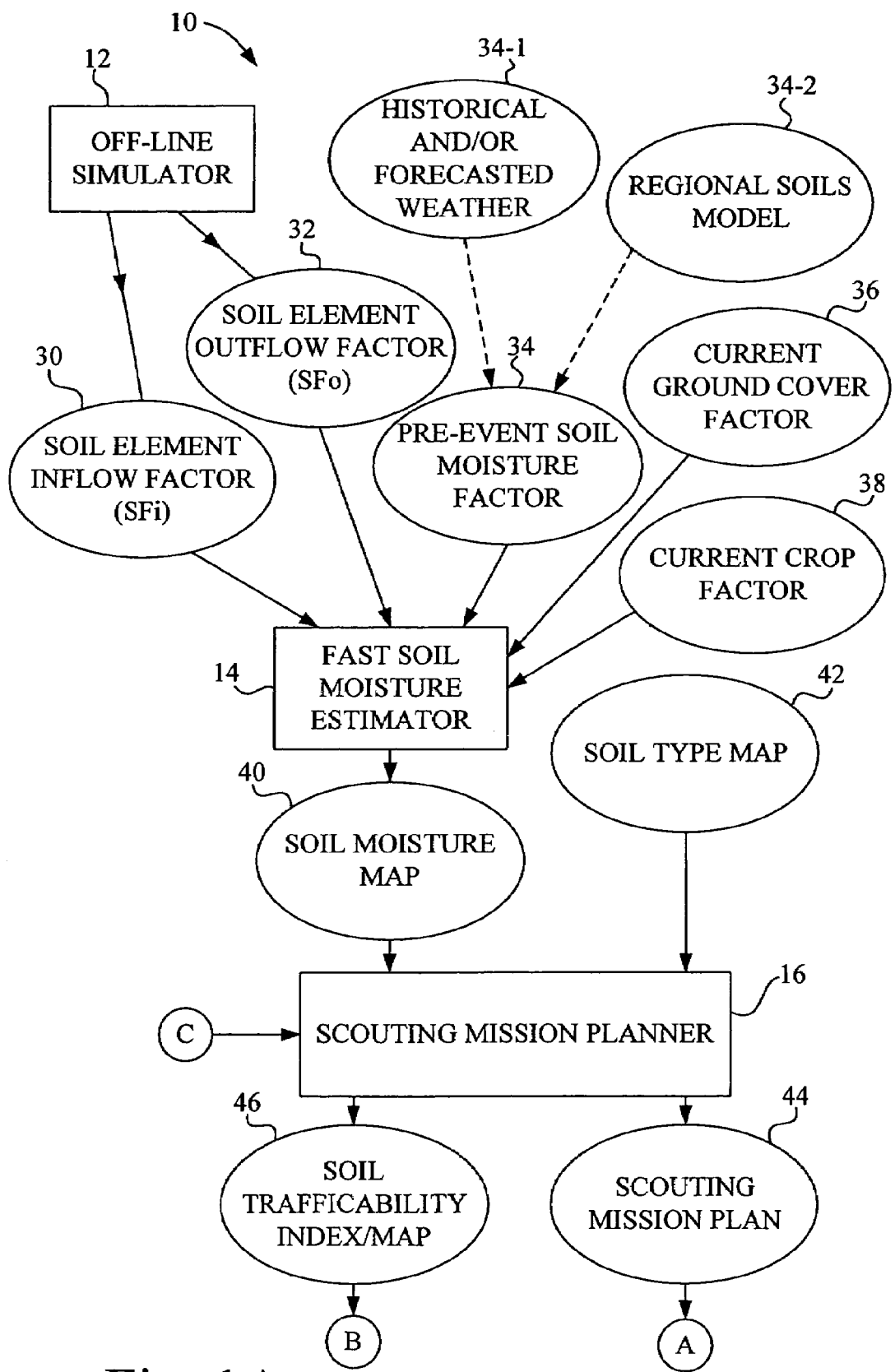
FIGS. 1A and 1B combine as a diagrammatic representation of a system in accordance with an embodiment of the present invention.
Figure 1B:
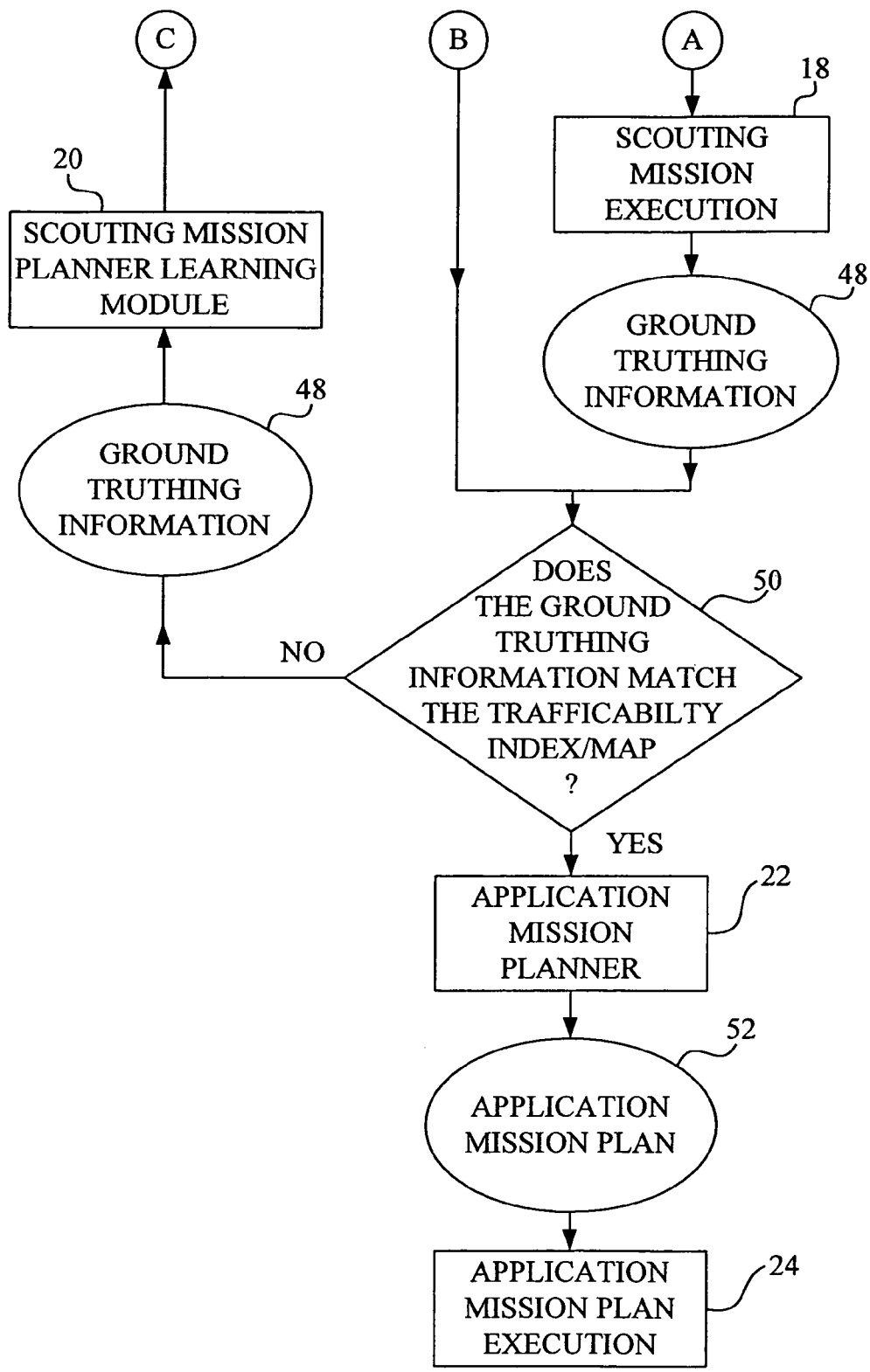
Figure 2A:
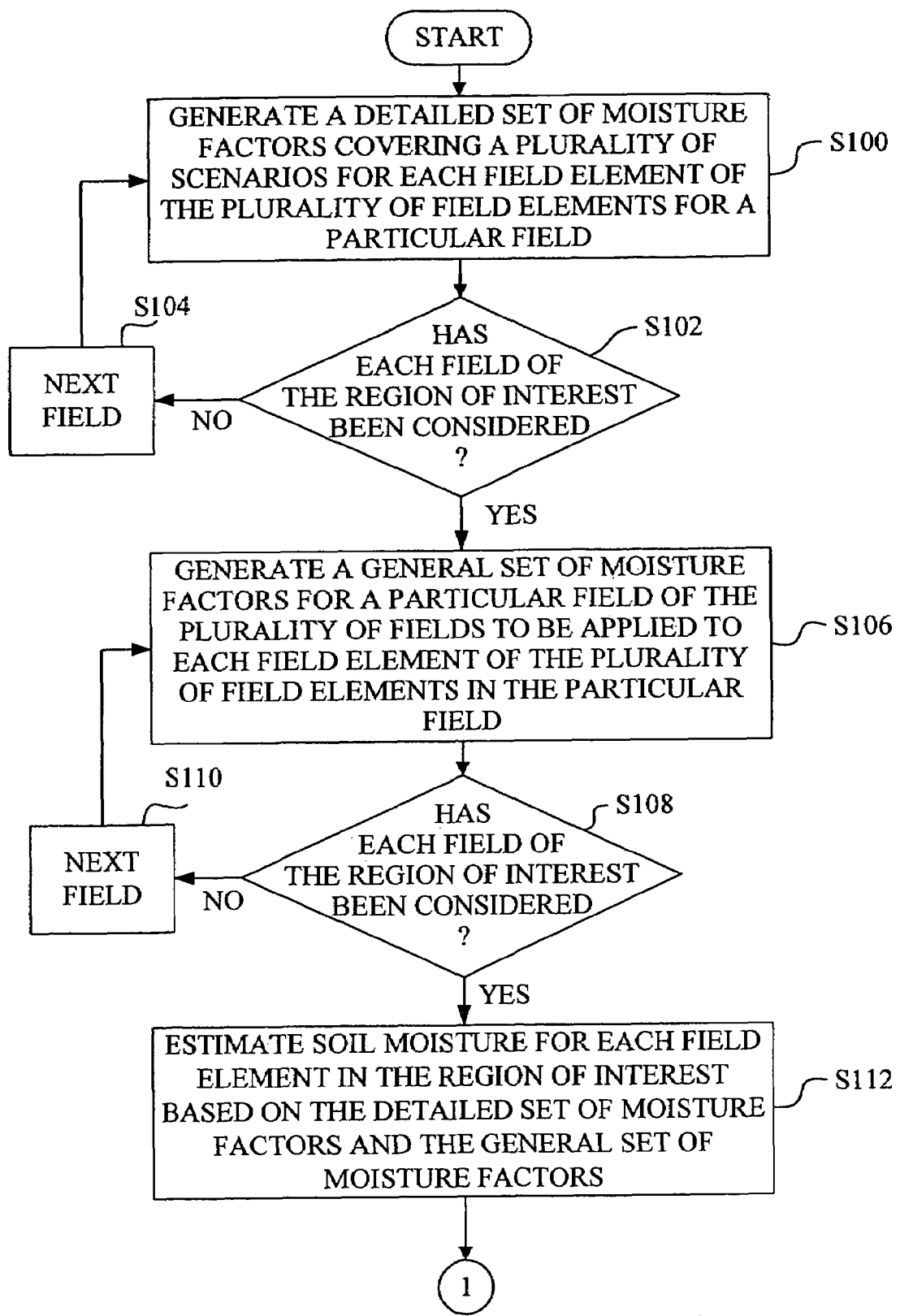
FIGS. 2A and 2B combine as flowchart depicting a method for determining field readiness using moisture modeling of a plurality of fields in a region of interest, in accordance with an embodiment of the present invention.
Figure 2B:
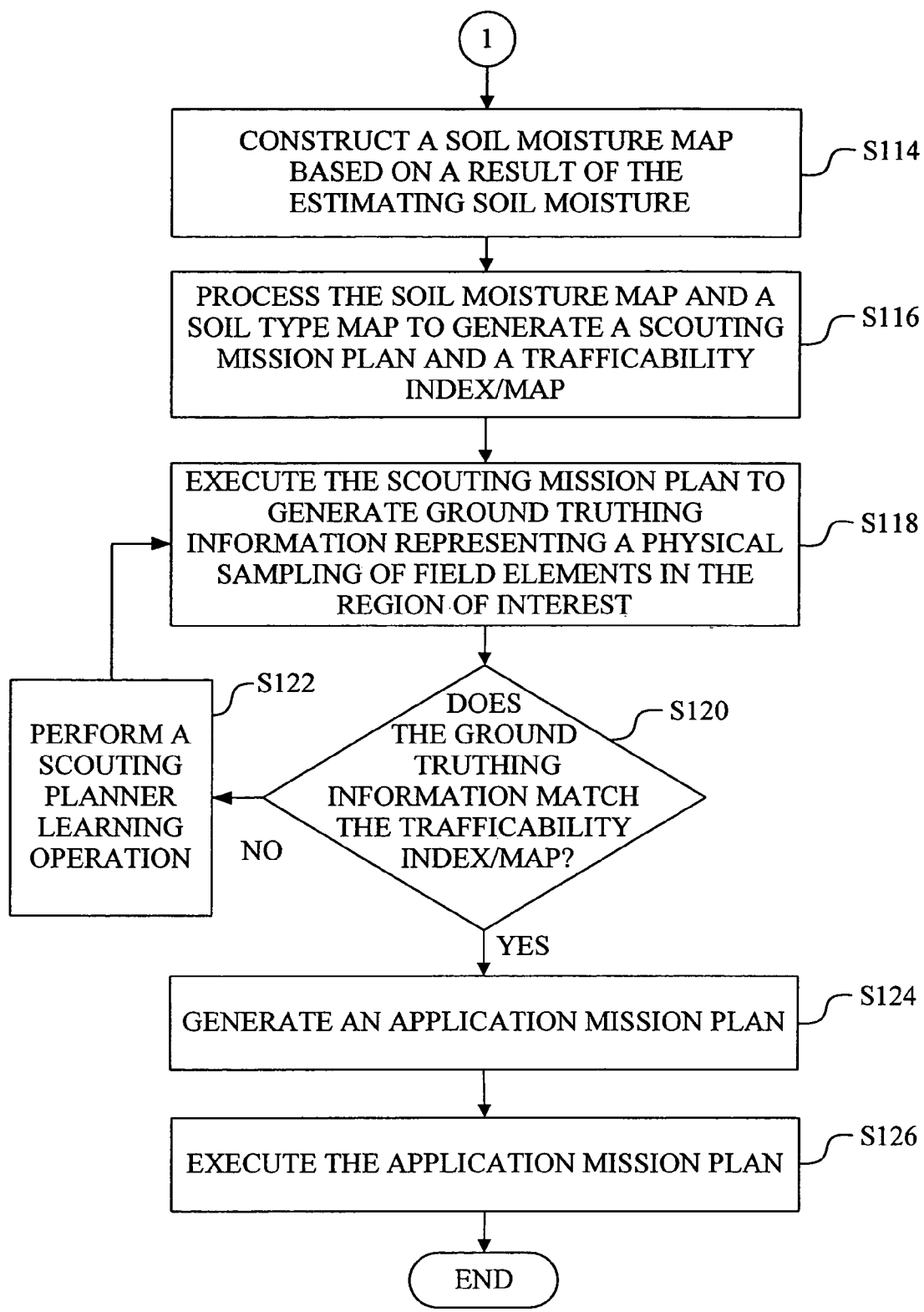

Referring now to the drawings, there is shown in FIGS. 1A and 1B a diagrammatic representation of a system 10 in accordance with an embodiment of the present invention, wherein function blocks are represented by rectangular blocks, and inputs to and outputs from the function blocks are resented by oval bubbles. System 10 may be used in conjunction with a method for determining field readiness using moisture modeling of a plurality of fields in a region of interest, as illustrated in the flowchart of FIGS. 2A and 2B.

Where applicable, the operations of the function blocks of system 10 shown in FIGS. 1A and 1B may be performed by a computer based on the process steps of the method of FIGS. 2A and 2B. The function blocks of system 10 may include an off-line simulator 12, a fast soil moisture estimator 14, a scouting mission planner 16, a scouting mission execution block 18, a scouting mission planner learning module 20, an application mission planner 22, and an application mission execution block 24. The scouting mission execution block 18 and application mission execution block 24 typically may be performed by human activity to carry out the respective missions, which may be computer aided.

In preparation for performing the process represented in FIGS. 2A and 2B for determining field readiness using moisture modeling of a plurality of fields in a region of interest, each field of the plurality of fields in the region of interest is divided into a plurality of field elements. In one application of the present invention, for example, at least one field of the plurality of fields is less than one square kilometer. The region of interest may be, for example, an area of about 25,000 square kilometers.

At step S100 of FIG. 2A, a detailed set of moisture factors covering a plurality of scenarios for each field element of the plurality of field elements for a particular field is generated. The detailed set of moisture factors may include, for example, a set of soil element inflow factors from which a soil element inflow factor 30 may be selected and a set of soil element outflow factors from which a soil element outflow factor 32 may be selected (see FIG. 1A).

Referring to FIG. 1A, each of the set of soil element inflow factors and the set of soil element outflow factors may be generated by off-line simulator 12. The determination of the detailed set of moisture factors covering various scenarios is time consuming to carry out, so this task may be performed only once for each field and may be done whenever computing resources are available. For example, the detailed simulations resulting in the detailed set of moisture factors that account for adding an inch of rain to an already wet field would be the same immediately after the event as it would be the preceding winter. The computation would thus be the same in each case and the results would be the same.

When a field is added to the active fields in the trade area, i.e., a region of interest, a detailed off-line simulation is performed by off-line simulator 12. For each field element, a soil element inflow factor 30 (SFi) and a soil element outflow factor 32 (SFo) are generated and various correction factors may be set to 1.0. The various correction factors may be modified during a "learning" process, as discussed in more detail below. Soil moisture in this example is assumed to be a continuous range from 0.0 (dry) to 1.0 (fully saturated). Alternately, the range could be captured in a finite set of states with names like "dry", "moist", "wet", "saturated", and "submerged", which may be advantageous if the changes in soil moisture for each element are modeled through fuzzy logic, finite state machines, Markov processes, etc.

The progression of soil moisture from 0.0 to 1.0 is non-linear with rainfall. This is because when the soil is very dry, lower layers are likely to draw the water down and out of the region quickly. As soils become saturated, rain run-off is a bigger factor. Depending on topography, the rain water may then run out of the field element on the surface and thus be slowed in absorbing water. If a particular field element receives water from all its neighboring field elements, the movement from wet to saturated may be accelerated relative to the rest of the field. Many field elements, then, will form an S-curve for soil moisture that increases as a function of rainfall. When conditions are dry, the increase in the soil moisture curve is slow, in the mid-range the soil moisture curve is linear, and as saturation is approached (for high, sloped ground) the increase in the soil moisture curve again is slow.

Off-line simulator 12 generates the set of soil element inflow factors, from which an individual soil element inflow factor 30 may be selected, by running bare soil simulations for multiple starting soil moistures, and hourly rainfall and/or evaporation rates. The set of soil element inflow factors may be represented as a lookup table that may be indexed by other system inputs, such as weather related and/or regional soil models which contribute to a pre-event soil moisture factor 34. The table may have, for example, 25 to 100 elements, so the off-line simulation for the field would likely need to be run 25 to 100 times, respectively, with different initial and rainfall conditions resulting in a 5×5 to a 10×10 lookup table.

The storage required, for example, for a 10×10 lookup table using 32 bit floating point numbers is 400 bytes. For the example of a trade area, i.e., region of interest, with 1 billion 5 m×5 m cells, the table would require 400 GB of storage. Current magnetic hard disks are reaching 1000 GB for use on desktop computers, so this storage requirement is not out of line with current available technology.

Similarly, multiple simulations are run to generate a lookup table representing the set of soil element outflow factors from which a particular soil element outflow factor 32 (SFo) is selected. Here, contributing factors are the current soil moisture, ranging from 0.0 to 1.0, and an hourly water outflow rate that captures site-specific adjustment to a base evaporation rate (ET0) due to topography, soil texture, etc., wherein ET0 is an evaporation rate of 0.

Carrying out calculations for only rainfall or for evaporation cuts the execution time approximately in half. For example, since relative the humidity is high during rain, it may be assumed that no evaporation occurs during the rain. That which is occurring is probably less than other sources of error in the system such as accurate hourly rainfall rates, initial soil moisture, etc. When the rain stops, evaporation begins and the amount of moisture in the soil is decremented based on the associated evaporation rate.

In the present embodiment, no attempt was made to model the soil at various depths. However, one skilled in the art will recognize how such an extension may be implemented by addition a third dimension to the field elements. For example, just as each field element has an x and y distance, say 5 m, it could also have a depth z of, for example, 0.25 m. Thus, the set of soil element inflow factors and the set of soil element outflow factors may be redefined to consider the moisture levels at adjacent depths based on additional field simulations.

At step S102 of FIG. 2A, it is determined whether each field of the region of interest has been considered. If the determination at step S102 is NO, the process proceeds to step S104 to increment to the next field, and step S100 is repeated for the next field. Steps S100 and S102 will typically be performed only once for each field element, due to the computationally intensive process associated with the detailed moisture factors.

If the determination at step S102 is YES, then the process proceeds to step S106.

At step S106, a general set of moisture factors for a particular field of the plurality of fields to be applied to each field element of the plurality of field elements in the particular field is generated. Referring to FIG. 1A, the general set of moisture factors may include, for example, pre-event soil moisture factor 34 that is based on historical weather and/or forecasted weather 34-1 and a regional soils model 34-2; a current ground cover factor 36; and a current crop factor 38.

The historical weather and/or forecasted weather 34-1 for rainfall and moisture removal (e.g., evaporation rate (ET0)) can be estimated for a particular field by in situ measurement, interpolation of National Oceanic and Atmospheric Administration (NOAA) measurements, Doppler radar rain estimates, etc.

A single pre-event soil moisture factor 34, e.g., a single hourly rainfall or evaporation rate (ET0) value for the entire field, is available for use by fast soil moisture estimator 14. An initial pre-event soil moisture factor 34 may come from a regional soils model 34-2, such as IBIS, a human estimate, remote sensed data, etc.

Current ground cover factor 36 considers the impact of crop canopy, residue, tillage practice, etc., and on a scale from zero (0) to one (1) is nearly one for bare ground.

Current crop factor 38 is a measure of crop water uptake, and is related to the crop stage. For example, crops at mid-season will also take up moisture through the roots.

A single value for each of current ground cover factor 36 and current crop factor 38 may be used for the whole field by fast soil moisture estimator 14 due to crop uniformity, but site-specific values may also be used, if desired.

At step S108 of FIG. 2A, it is determined whether each field of the region of interest has been considered. If the determination at step S108 is NO, the process proceeds to step S110 to increment to the next field, and step S106 is repeated for the next field. If the determination at step S108 is YES, then the process proceeds to step S112.

At step S112, the soil moisture for each field element in the region of interest is estimated based on the detailed set of moisture factors and the general set of moisture factors described above. Referring to FIG. 1A, this estimating may be performed by fast soil moisture estimator 14, which processes the inputs made up of a soil element inflow factor 30 selected from the set of soil element inflow factors, a soil element outflow factor 32 selected from set of soil element outflow factors, pre-event soil moisture factor 34, current ground cover factor 36, and/or current crop factor 38.

The following description of fast soil moisture estimator 14 will be for the current soil moisture, but forecasts of rainfall and evaporation rate (ET0) could be used to estimate future states of the field for use by the mission planner, if desired. The rainfall amount used need not be hourly totals, but the time scale should be the same as that used to generate the set of soil element inflow factors and the set of soil element outflow factors that incorporate water runoff and absorption by lower soil layers.

When invoked, fast soil moisture estimator 14 estimates the field soil moisture for each field element in a particular field using either the "Raining" (Equation 1) or the "Drying" (Equation 2) equations set forth below. Both equations could be used simultaneously, but the execution time would approximately double.

$$\text{Raining: Current Soil Moisture}(t+1) = \text{Current Soil Moisture}(t) + \text{Hourly Rainfall} * SFi * \text{Current Ground Cover Factor} \quad \text{(Equation 1)}$$

wherein:

Current Soil Moisture (t+1) is the next soil moisture following the Current Soil Moisture (t);

Current Soil Moisture (t) is the soil moisture at the current time t;

Hourly Rainfall is an amount of rainfall in one hour for a particular field;

SFi is a soil element inflow factor 30 selected from the set of soil element inflow factors corresponding to a field element of interest of the particular field; and Current Ground Cover Factor is the current ground cover factor 36 for the particular field.

$$\text{Drying: Current Soil Moisture}(t+1) = \text{Current Soil Moisture}(t) + \text{Hourly } ET0 * SFo * \text{Current Crop Factor} \quad \text{(Equation 2)}$$

wherein:

Current Soil Moisture (t+1) is the next soil moisture following the Current Soil Moisture (t);

Current Soil Moisture (t) is the moisture at the current time t;

Hourly ETO is an amount of evaporation in one hour for a particular field;

SFo is a soil element outflow factor 32 selected from the set of soil element outflow factors corresponding to a field element of interest of the particular field; and Current Crop Factor is the current crop factor 38 for the particular field.

The calculation of the new soil moisture for each field element requires reading the current soil moisture from memory, looking up the value of SFi from the set of soil element inflow factors and/or looking up the value of SFo from the set of soil element outflow factors for the field element; using the cached values for rainfall and evaporation rate (collectively, pre-event soil moisture factor 34), current ground cover factor 36, and current crop factor 38; performing the calculation; and writing the result back to memory. Modern computer systems use architectural features to promote parallel computation and fast floating point math operations to achieve speeds in the hundreds of millions of calculations per second. Thus, for example, the 1 billion 5 m by 5 m cells in the example 25,000 square kilometer trade area should be updateable in a reasonable period of time for use by scouting mission planner 16.

At step S114 of FIG. 2B, fast soil moisture estimator 14 constructs a soil moisture map 40 based on a result of the estimating soil moisture performed at step S112.

At step S116, the soil moisture map 40 generated at step S114 and a soil type map 42 is processed to generate a scouting mission plan 44 and a trafficability index/map 46. This processing may be performed, for example, by scouting mission planner 16 of FIG. 1A. For example, one output of scouting mission planner 16 may be in the form of a trafficability index lookup table, which may be used to form a trafficability map of each field element in the region of interest.

In contrast to the current ad hoc driving around the countryside approach to estimating field readiness, use of scouting mission plan 44 will optimize the amount of scouting done by identifying the smallest number of the most valuable places to visit, e.g., by providing a prioritized list of fields in the region of interest in order of field readiness.

Scouting mission planner 16 takes advantage of the fact that wetter and dryer areas of a field will always be wetter and dryer areas of the field. It is highly unlikely that a rain event would leave field hilltops saturated and low areas dry. Similarly, for comparable starting conditions and equal rain events, wetter fields and dryer fields will retain those relative attributes.

In one embodiment, scouting mission planner 16 takes the soil moisture map 40 and soil type map 42, along with applicator tire loading data, to generate the soil trafficability index/map 46 of the field. One example of a soil trafficability index is "percent of field with little or no soil compaction from applicator." For example, the policy of a fertilizer dealer may be to not apply fertilizer to a field unless the soil trafficability index is greater than 90%. The scouting mission planner 16 can compute the soil trafficability indices for fields needing application and sort them by index value. Scouts can be sent to certain fields to confirm that the fields that have a soil trafficability index just above a threshold are ready for application, and those having a soil trafficability index below the threshold are not ready for application. Assuming the soil trafficability indices are fairly accurate, it can be assumed that fields that have a soil trafficability index much less than the threshold won't be ready and those fields that have a soil trafficability index much greater than the threshold will be ready, and that there is little value in visiting those fields.

At step S118, the scouting mission plan 44 generated by scouting mission planner 16 is executed at scouting mission execution block 18 shown in FIG. 1B to generate ground truthing information 48 representing, for example, a physical sampling of field elements in the region of interest. Thus, in executing scouting mission plan 44, a physical inspection is made of at least one field element in a subset of the plurality of fields in the region of interest. The term "ground truthing" means a physical determination of a truth relating to ground conditions of the area, e.g., field element, of interest. "Ground truthing" includes, but is not limited to, observations by humans, data obtained from sensors, such as in situ soil moisture sensors, and remote sensed data that provides information such as precision soil moisture at a point and/or regions of similar soil moisture.

At step S120 of FIG. 2B, relating to decision block 50 of FIG. 1B, it is determined whether the ground truthing information 48 matches the soil trafficability index/map 46. In other words, it is determined whether the soil trafficability index/map 46 is accurate.

If the determination at step S120 is NO, then the process proceeds to step S122 wherein ground truthing information 48 is processed by scouting mission planner learning module 20, which performs a scouting mission planner learning operation. For example, scouting mission planner learning module 20 may use the ground truthing information 48 to modify the next trafficability index generated by scouting mission planner 16 if the trafficability index is deemed not accurate, e.g., a determination of NO at step S120, by modifying the correction factors associated with one or more moisture factors.

While not required for basic operation, ground truthing and learning can greatly improve the overall performance and value of the present invention in the immediate and long term. Further, the ground truthing information 48 may be adjusted to be in accordance with current practices for reasonableness, precision, and accuracy. The likely source of differences between simulated and observed soil moisture need to be identified, such as rainfall measurements or soil model. If the likely source is the soil model, corrections and learning can be applied at a number of spatial and temporal levels. Examples include, but are not limited to the following: the correction may be applied to the current field or a portion thereof for the current rain event; using methods of identifying field element similitude, the correction may be applied to other fields for the current rain event; using machine learning techniques, the SFi and SFo functions for the current field or portion thereof may be corrected for future rain events; using methods of identifying similitude between field simulation elements and machine learning techniques, the SFi and SFo functions for the field observed and similar fields may be adjusted; also, using methods of identifying similitude between field simulation elements and machine learning techniques, the generation of SFi and SFo functions by off-line simulator 12 may be improved.

If the determination at step S120 is YES, then the process proceeds to step S124, wherein application mission planner 22 generates an application mission plan 52 (see FIG. 1B). In other words, application mission plan 52 is generated if the soil trafficability index is accurate. Once the scouting mission has confirmed that fields are ready, application mission planner 22 can then use the soil trafficability index/map 46 to generate applicator missions.

At step S126 of FIG. 2B, the application mission plan 52 is executed, as illustrated in the application mission plan execution block 24 of FIG. 1B. At the simplest level, for example, fertilizer applicators could be dispatched to the fields that are most ready first. A more economical approach would be to utilize logistics techniques to optimize the order in which ready fields are visited to minimize the travel cost of applicators and tender vehicles. Another level of refinement would be to generate path plans for the fertilizer applicators from the soil trafficability maps so that the least ready areas of the fields would be visited last when the weight of the applicator was reduced by the amount of material already spread.

For nitrogen fertilizer application, the soil moisture map 40 and the soil type map 42 may be used to adjust application rate maps based on soil samples taken prior to precipitation on the field that can affect available nitrogen through leeching or de-nitrification.

Having described the preferred embodiment, it will become apparent that various modifications can be made without departing from the scope of the invention as defined in the accompanying claims.

The invention claimed is:

1. A method for determining field readiness using moisture modeling of a plurality of fields in a region of interest, each field of said plurality of fields being divided into a plurality of field elements, comprising:
   (a) generating a detailed set of moisture factors covering a plurality of scenarios for each field element of said plurality of field elements for a particular field;
   (b) repeating act (a) for each field of said region of interest;
   (c) generating a general set of moisture factors for a particular field of said plurality of fields to be applied to each field element of said plurality of field elements in said particular field;
   (d) repeating act (c) for each field of said plurality of fields in said region of interest; and
   (e) estimating soil moisture for each field element in said region of interest based on said detailed set of moisture factors and said general set of moisture factors.

2. The method of claim 1, wherein acts (a) and (b) are performed only once for each field element.

3. The method of claim 1, further comprising constructing a soil moisture map based on a result of said estimating soil moisture.

4. The method of claim 3, further comprising processing said soil moisture map and a soil type map to generate at least one of a scouting mission plan and a soil trafficability index.

5. The method of claim 4, wherein said soil trafficability index is used to form a soil trafficability map.

6. The method of claim 4, further comprising:
executing said scouting mission plan to generate ground truthing information representing a physical sampling of field elements in said region of interest;
comparing said ground truthing information with said soil trafficability index to determine the accuracy of said soil trafficability index.

7. The method of claim 6, further comprising generating an application mission plan if said soil trafficability index is accurate.

8. The method of claim 6, wherein said executing said scouting mission plan is performed by a physical inspection of at least one field element in a subset of said plurality of fields in said region of interest.

9. The method of claim 6, wherein said ground truthing information includes human observations and sensor data.

10. The method of claim 6, further comprising performing a learning operation to modify said soil trafficability index if said soil trafficability index is not accurate.

11. The method of claim 1, wherein at least one field of said plurality of fields is less than one square kilometer.

12. The method of claim 1, wherein said detailed set of moisture factors includes a set of soil element inflow factors and a set of soil element outflow factors.

13. The method of claim 1, wherein said general set of moisture factors includes a pre-event soil moisture factor based on at least one of historical weather, forecasted weather, and a regional soils model.

14. The method of claim 1, wherein said general set of moisture factors includes at least one of a current ground cover factor and a current crop factor.

15. A method for generating a scouting mission plan, comprising:
(a) dividing each field of a plurality of fields into a plurality of field elements;
(b) generating a detailed set of moisture factors covering a plurality of scenarios for each field element of said plurality of field elements for a particular field;
(c) repeating act (b) for each field of said region of interest;
(d) generating a general set of moisture factors for a particular field of said plurality of fields to be applied to each field element of said plurality of field elements in said particular field;
(e) repeating act (d) for each field of said plurality of fields in said region of interest;
(f) estimating soil moisture for each field element in said region of interest based on said detailed set of moisture factors and said general set of moisture factors;
(g) constructing a soil moisture map based on a result of said estimating soil moisture; and
(h) processing said soil moisture map and a soil type map to generate said scouting mission plan.

16. The method of claim 15, wherein said scouting mission plan provides to a user a prioritized list of fields in the region of interest in order of field readiness.

17. The method of claim 15, wherein said detailed set of moisture factors includes a set of soil element inflow factors and a set of soil element outflow factors.

18. The method of claim 15, wherein said general set of moisture factors includes a pre-event soil moisture factor based on at least one of historical weather, forecasted weather, and a regional soils model.

19. The method of claim 15, wherein said general set of moisture factors includes at least one of a current ground cover factor and a current crop factor.

20. The method of claim 15, wherein at least one field of said plurality of fields is less than one square kilometer.

* * * * *